United States Patent
Carucci et al.

(10) Patent No.: US 11,319,223 B2
(45) Date of Patent: May 3, 2022

(54) APPARATUS FOR PREPARING AND DISPENSING A FLOCCULANT SOLUTION TO DEWATERING AN AQUEOUS PROCESS STREAM

(71) Applicants: Ecolab USA Inc., Saint Paul, MN (US); José Rafael Hernández Carucci, BV Oegstgeest (NL); Jochen Friedrich Knauer, Bad Homburg (DE); Alan Smith, Cheshire (GB)

(72) Inventors: José Rafael Hernández Carucci, BV Oegstgeest (NL); Jochen Friedrich Knauer, Bad Homburg (DE); Alan Smith, Cheshire (GB)

(73) Assignee: Ecolab USA Inc., St. Paul, MN (US)

( * ) Notice: Subject to any disclaimer, the term of this patent is extended or adjusted under 35 U.S.C. 154(b) by 1170 days.

(21) Appl. No.: 15/502,119

(22) PCT Filed: Aug. 8, 2014

(86) PCT No.: PCT/EP2014/067112
§ 371 (c)(1),
(2) Date: Feb. 6, 2017

(87) PCT Pub. No.: WO2016/020020
PCT Pub. Date: Feb. 11, 2016

(65) Prior Publication Data
US 2017/0233268 A1   Aug. 17, 2017

(51) Int. Cl.
*C02F 1/52*     (2006.01)
*C02F 11/14*    (2019.01)
*C02F 11/147*   (2019.01)

(52) U.S. Cl.
CPC .......... *C02F 1/5227* (2013.01); *C02F 11/147* (2019.01); *C02F 2201/004* (2013.01);
(Continued)

(58) Field of Classification Search
CPC .......... C02F 1/5227; C02F 1/52; C02F 11/14; C02F 2201/004; C02F 2201/005;
(Continued)

(56) References Cited

U.S. PATENT DOCUMENTS 5,407,975 A * 4/1995 Pardikes .................... B01F 1/00
523/322

FOREIGN PATENT DOCUMENTS

DE        4240092 A1 *  6/1994  ............... B03D 3/06
DE        4240092 A1 *  6/1994  ............. B01D 21/01
(Continued)

OTHER PUBLICATIONS

DE 4240092 A1 English description, Jun. 1994, IMHOF Rainer et al.*
(Continued)

*Primary Examiner* — Akash K Varma
(74) *Attorney, Agent, or Firm* — Fredrikson & Byron, P.A.

(57) ABSTRACT

An apparatus for preparing and dispensing a flocculant solution to dewatering an aqueous process stream includes a mixing pump, a maturing tank, and a feeding unit. The mixing pump mixes the flocculant solution and builds up a pressure onto the flocculant solution. The maturing pressure tank is fluidly connected with the mixing pump, so that the pressurized diluted flocculant solution is led from the mixing pump into the maturing pressure tank and matured therein under pressure that is above atmosphere pressure.

14 Claims, 4 Drawing Sheets

(52) U.S. Cl.
CPC .... *C02F 2201/005* (2013.01); *C02F 2209/03* (2013.01); *C02F 2209/44* (2013.01); *C02F 2301/024* (2013.01); *C02F 2301/066* (2013.01)

(58) Field of Classification Search
CPC .............. C02F 2209/03; C02F 2209/44; C02F 2301/024; C02F 2301/066; C02F 11/147; Y02W 10/20; A61P 1/00; A61P 35/00; A61P 35/04; C07K 14/47; C12N 9/00; C12Q 1/6886; C12Q 2600/158; C08J 3/03; C08J 3/05; C08L 1/00; C08K 3/00; G01N 33/57419; B01F 1/00; B01F 3/12; B01F 5/00; B01D 21/01; B03D 3/06
USPC ........................................................ 210/738
See application file for complete search history.

(56) References Cited

FOREIGN PATENT DOCUMENTS

| GB | 2248192 A | * | 4/1992 | ............ B01F 5/0057 |
|----|-----------|---|--------|--------------------------|
| GB | 2248192 A |   | 4/1992 |                          |
| WO | 2008016817 A1 |   | 2/2008 |                      |
| WO | WO 2008/016817 A1 | * | 2/2008 | .............. C02F 11/14 |
| WO | WO-2008016817 A1 | * | 2/2008 | .............. C02F 11/14 |

OTHER PUBLICATIONS

International Patent Application No. PCT/EP2014/067112, International Search Report and Written Opinion dated Nov. 20, 2014, 7 pages.

* cited by examiner

APPARATUS FOR PREPARING AND DISPENSING A FLOCCULANT SOLUTION TO DEWATERING AN AQUEOUS PROCESS STREAM

RELATED APPLICATIONS

This application is a 35 U.S.C. 371 national stage filing from International Application No. PCT/EP2014/067112, filed Aug. 8, 2014, the entire contents of which are incorporated herein by reference.

FIELD OF THE INVENTION

The present invention is directed to an apparatus for preparing and dispensing a flocculant solution to dewatering an aqueous process stream and to a method of increasing the activity of the flocculants polymer therewith.

BACKGROUND

Flocculants for treating an aqueous process stream, such as slurry, sewage sludge or industrial sludge are widely used. A common process for dewatering slurry, such as sewage sludge or industrial sludge, in the purification of waste water is passing the sludge through a dewatering system, which separates the liquid from the solid fraction of the slurry. The polymer solution is added to the slurry before the dewatering unit to improve the solid/liquid separation by a process known as flocculation. Flocculation is a condition in which clays, polymers or other small charged particles become attached and form a floc. Polymeric flocculants comprise inter alia modified polyacrylates, modified polymethacrylates, modified polyacrylamides as well as modified polymethacrylamides.

Flocculation is widely employed in the purification of drinking water, as well as sewage treatment, storm-water treatment and treatment of other industrial wastewater streams. The filtered-out dewatered sludge dry mass is often referred to as filter cake. The flocculants also improve the passage of the water through the filter cake in the subsequent quantities of sludge.

The patent application DE 10210511 refers to an apparatus with a first mature tank, wherein an aqueous solution of a polymeric flocculant is matured and stored. The aqueous solution of the polymeric flocculant in that mature tank is constantly stirred with a mixer. After maturation of the polymeric flocculant in the first tank, the matured aqueous polymeric flocculant solution is transferred into a second storage tank also named as feed tank. In the second storage tank the transferred polymeric matured aqueous flocculant solution is constantly stirred further. The aqueous flocculant solution is continuously dispensed from the second tank during the filtration or dewatering process and fed into the slurry of the process stream, until the storage tank is empty. The matured flocculant from the first tank is pumped into the empty second storage tank and fed into the slurry of the process stream for dewatering the sludge.

The above mentioned mixer comprises at least a first maturing pressure tank and a second storage tank as well as a pump unit between both tanks.

It is always an object to provide an apparatus for treating aqueous process streams which has a low vertical range of manufacture, a more compact and simple construction.

BRIEF SUMMARY OF THE INVENTION

This object is achieved by providing an apparatus for preparing and dispensing a flocculant solution to dewatering an aqueous process stream, wherein the apparatus comprises a mixing pump that mixes the flocculant solution and builds up a pressure onto the flocculant solution, and a maturing pressure tank, whereby the maturing pressure tank is fluidly connected with the mixing pump, so that the pressurized diluted flocculant solution is led from the mixing pump into the maturing pressure tank and matured therein under pressure that is above atmosphere pressure.

According to another aspect the apparatus for preparing and dispensing a flocculant solution to dewatering an aqueous process stream comprises at least one mixing pump, wherein the mixing pump is a centrifugal pump.

According to another aspect the apparatus for preparing and dispensing a flocculant solution to dewatering an aqueous process stream, wherein after the mixing pump, the fluid flow of the pressurized diluted flocculant solution into the process stream to be treated therewith is driven by the pressure of the pressurized diluted flocculant solution generated by the mixing pump.

According to another aspect the apparatus for preparing and dispensing a flocculant solution to dewatering an aqueous process stream, wherein the fluid flow of the pressurized diluted flocculant solution is driven by the pressure of the pressurized diluted flocculant solution so that in fluid flow direction, after the mixing pump, the fluid flow is driven by the pressure of the pressurized diluted flocculant solution only and no additional pump is arranged in fluid flow direction, after the mixing pump.

According to one aspect the apparatus comprises one tank only to store and/or mature the diluted aqueous flocculant solution, which is the maturing pressure tank, where no stirring occurs. From here, that means the maturing pressure tank, the diluted aqueous flocculant solution it is directly fed via the in-line mixer into the sludge-slurry-stream.

The agitating unit of the mixing pump can be an impeller and/or a turbine. The mixing pump may have a rotation speed of at least about ≥100 rpm for mixing the polymer into the water solution, resulting in increasing of the conductivity and/or for increasing the rate of increase per time of the conductivity of the flocculant solution.

According to another aspect the apparatus comprises at least one mixing pump and at least one maturing pressure tank, preferably one maturing pressure tank only, into which a pressurized diluted flocculant solution is led from the mixing pump and matures and/or stored under pressure that is above atmosphere pressure.

The pressurized diluted flocculant solution is stored in the processing tank, for example maturing of the pressurized diluted flocculant solution, whereby during storage time the pressure of the pressurized diluted flocculant solution is uphold in the processing tank.

According to one aspect the mixing pump is fluidly connected with the inlet port of the processing tank.

In general, the aqueous process stream to be treated with the flocculant can be sludge which will result in flocculation and is fed into for example with a mixing unit.

According to another aspect the apparatus comprises:
 at least one mixing pump for mixing and diluting a concentrated flocculant solution with a solvent, preferably the solvent is water,
 at least one maturing pressure tank in which the pressurized diluted flocculant solution received from the mixing pump is lead via a diluted flocculant line into and stored under pressure that is above atmosphere pressure, at least one feeding unit connected with the pressurized processing tank, for feeding diluted flocculant solution into the aqueous process stream.

According to one embodiment it is understood that the feeding unit may not comprise a pump, that means that the feeding unit is driven by the pressure of the pressurized diluted flocculant solution, It is understood that "fluid flow direction" means downstream.

It is understood that the total weight percent amount of all components, substances or agents of a composition are selected such that it does not exceed 100 wt.-%.

It is understood that, as used here, "percent", "%", and the like are intended to be synonymous with, "weight percent", "wt-%", etc.

As used herein, the term "ready to use" refers to a diluted flocculant solution that can be directly applied to an aqueous process stream, preferably sludge, without any further dilution.

As used herein, the term "mixing pump" refers to a pump that mixes and transports the flocculant solution by the conversion of rotational kinetic energy to the hydrodynamic energy of the flocculant solution flow.

The rotational energy of a mixing pump typically comes from an engine or electric motor. The fluid, here the flocculant solution, enters the pump agitating unit along or near to the rotating axis and is mixed and accelerated by the impeller and flowing radially outward.

The agitating unit can be an impeller, a stirring unit and/or a turbine suitable to mix and/or to transport the flocculant solution.

A mixing pump that may be used is a centrifugal pump and preferably a multi-stage centrifugal pump. Centrifugal pumps that can be used are multi-stage centrifugal pumps, for example obtainable from the company Grundfos Pumps Corporation, for example a CR Multi-Stage Centrifugal Pump or a Lowara BG Series Single Stage Pump obtainable for example from Brown Brothers Engineers.

As used herein, the term "increased conductivity" means that the conductivity of the diluted flocculant solution before it is mixed in the mixing pump is lower than the conductivity of the flocculant solution after it is mixed with the mixing pump.

The "apparatus" for preparing and dispensing a flocculant solution to dewatering an aqueous process stream can also be named "dispenser".

The term "maturing pressure tank" means that the maturing pressure tank receive a pressurized diluted flocculant solution with a pressure above atmosphere pressure. Atmosphere pressure is 10,13 N/cm$^2$ (1013 mbar).

The term "mixing" means with respect to the mixing pump that a concentrated flocculant solution is combined with a solvent, preferably water obtaining a diluted flocculant solution.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about" the claims include equivalents to the quantities.

It should be noted that, as used in this specification and the appended claims, the singular forms "a", "an", and "the" include plural referents unless the content clearly dictates otherwise.

It should also be noted that the term "or" is generally employed in its sense including "and/or" unless the content clearly dictates otherwise.

It is specifically understood that any numerical value recited herein (e.g., ranges) includes all values from the lower value to the upper value, i.e., all possible combinations of numerical values between the lowest value and the highest value enumerated are to be considered to be expressly stated in this application. For example, if a concentration range is stated as 1% to 50%, it is intended that values such as 2% to 40%, 10% to 30%, or 1% to 3%, etc., are expressly enumerated in this specification. These are only examples of what is specifically intended.

DETAILED DESCRIPTION

It is another intend to make up a higher concentration of a diluted flocculant polymer solution having a faster polymer activation that can be fed into a process stream for dewatering thereof. The conductivity is an indicator of polymer activation. That means that an increase of conductivity indicates an increase of activation of the polymer in the diluted flocculant polymer solution.

It has been surprisingly found that mixing the diluted flocculant solution in a mixing pump with an rpm of at least about ≥100 rpm significant increases the conductivity and/or increases the rate of increase per time of the conductivity, so that a higher concentrated flocculant solution can be processed and fed to dewatering an aqueous process stream.

Further, it has been further surprisingly found that although a higher concentrated flocculant solution is fed to dewatering an aqueous process stream the total flocculant solution consumption can be reduced compared to the same sludge dewatering using a flocculant solution that is not mixed with a mixing pump and stored in a maturing pressure tank according to the invention.

According to one aspect, due to the increase of the conductivity of a mixed flocculant solution, a mixed aqueous flocculant solution of about ≥1 wt.-% to about ≤10 wt.-%, preferably of about ≥1.5 wt.-% to about ≤5 wt.-%, and also preferred of about ≥2 wt.-% to about ≤4 wt.-%, can be processed to be fed to dewatering an aqueous process stream.

The water savings when making flocculant polymer solutions with higher concentrations are obvious. When increasing from 1 wt.-% to 4 wt.-% aqueous flocculant polymer solutions, there are water savings of 75%. This can be as high as 90%.

A benefit of the apparatus for preparing and dispensing a flocculant solution to dewatering an aqueous process stream comprising the mixing pump is that due to the increase of the conductivity a higher concentrated flocculant solution can be processed and fed to dewatering an aqueous process stream.

In this connection it has be surprisingly found that a higher concentrated flocculant solution fed to dewatering an aqueous process stream may reduces the total flocculant consumption to achieve the same sludge dewatering compared to a lower concentrated flocculant solution.

The mixing pump may build up a pressure onto the mixed flocculant solution, so that the mixed flocculant solution, also named diluted flocculant solution, is pressurized. That means that the pressure of the flocculant solution before mixing is lower that the pressure after mixing the flocculant solution with the mixing pumps. With other words the mixing pump can be used to pressurize the mixed flocculant solution.

Thus, it can be another benefit of the present apparatus, suitable for preparing and dispensing a flocculant solution to dewatering an aqueous process stream, that due to the combination of the mixing pump for mixing and diluting a concentrated flocculant solution with a solvent, preferably water, and the pressurized processing tank, wherein the mixed diluted flocculant solution is stored under pressure, doesn't need an additional mixer and/or agitator in the pressurized tank for mixing the pressurized flocculant solution. Thus, the pressurized flocculant solution can be directly fed from the maturing pressure tank whiteout mixing and/or agitating to the aqueous process stream to be treated, preferably sludge.

Another benefit of the present apparatus, suitable for preparing and dispensing a flocculant solution to dewatering an aqueous process stream is that after the mixing pump there is no additional pump needed, because the pressurized flocculant solution can be fed to the aqueous process stream due to the existing pressure.

That allows building up an apparatus for dispensing flocculants that doesn't need a mixer, also named "agitator", except the mixing pump, nor a conveyance pump, also named "discharged pump" for pumping the diluted flocculant solution from the tank into the process stream, preferably sludge.

It has been further surprisingly found that the weight amount of mixed pressurized flocculant solution can be reduced to achieve the same dewatering results if fed into an aqueous process stream for dewatering for example a sludge compared to the same diluted flocculant solution differs in that only is not mixed with a mixing pump to increase the conductivity of the diluted flocculant solution.

The mixing pump that may be used to mix the concentrated flocculant solution with a solvent, preferably water, is a pump that mixes a flocculant solution and builds up a pressure onto the mixed flocculant solution.

According to one aspect the rotating speed of the agitating unit, preferably at least one an impeller or at least one turbine, of the mixing pump, preferably a centrifugal pump, can be about ≥100 rpm (rotation per minute) to about ≤5000 rpm, preferably about ≥200 rpm to about ≤4800 rpm, further preferred about ≥400 rpm to about ≤4600 rpm, more preferred about ≥600 rpm to about ≤4200 rpm and even more preferred about ≥800 rpm to about ≤4000 rpm and most preferred about ≥1000 rpm to about ≤4000 rpm, about ≥2000 rpm to about ≤4000 rpm or about ≥3000 rpm to about ≤4000 rpm.

The mixing can be achieved by combining the fluid flow of the concentrated flocculant solution with the fluid flow of the solvent, preferably water, at a mixing point and the diluted flocculant solution is lead to the mixing pump where it is mixed and pressurized. From the mixing pump the pressurized diluted flocculant solution is lead to the processing tank, wherein the diluted flocculant solution is stored and/or matured under pressure above atmospheric.

The maturing pressure tank receives the pressurized and mixed diluted flocculant solution from the mixing pump. The maturing pressure tank may not have means to build up an additional pressure to the mixed diluted flocculant solution stored therein. The maturing pressure tank is designed to withstand the pressure of the pressurized diluted flocculant solution therein.

According to one aspect there are no further means arranged between the outlet of the mixing pump and the inline mixer that builds up a pressure to the pressurized mixed diluted flocculant solution.

The maturing pressure tank can have an inner volume of about ≥50 liters to about ≤1000 liters, preferably about ≥60 liters to about ≤500 liters, further preferred of about ≥70 liters to about ≤200 liters, more preferred of about ≥80 liters to about ≤150 liters and most preferred of about ≥85 liters to about ≤100 liters.

According to one aspect the mixing pump can pump the diluted flocculant solution in a circular tube for a number of turns and then discharging the pressurized diluted flocculant solution to the processing tank. The process of discharging the pressurized diluted flocculant solution to the maturing pressure tank can be continuously or discontinuously.

A mixing pump that can be used is for example known as centrifugal pump, radial pump or rotary pump. Thus, the mixing pump that may be beneficially be used combine the properties of a mixer and of a fed pump or conveyance pump.

A pump that can be used may have a flow volume of about ≥0.5 $m^3$/h to about ≤10 $m^3$/h, preferably about ≥1 $m^3$/h to about ≤4 $m^3$/h.

According to one embodiment the mixing pump operates at a pressure of at least about ≥15 $N/cm^2$ to about ≤100 $N/cm^2$, preferably of at least about ≥20 $N/cm^2$ to about ≤80 $N/cm^2$, more preferred of at least about ≥25 $N/cm^2$ to about ≤60 $N/cm^2$, further more preferred of at least about ≥30 $N/cm^2$ to about ≤50 $N/cm^2$ or of at least about ≥45 $N/cm^2$ to about ≤75 $N/cm^2$.

According to one aspect the polymeric flocculant solution can be cycled through the mixing pump, whereby the residence time of the flocculant solution in the mixing pump can be ≥0.5 seconds to about ≤120 seconds, preferably ≥0.8 seconds to about ≤90 seconds, further preferred ≥1 seconds to about ≤80 seconds, in addition preferred ≥3 seconds to about ≤70 seconds and more preferred about ≥5 seconds to about ≤60 seconds or about ≥10 seconds to about ≤40 seconds.

The residence time of the flocculant solution in the mixing pump and/or the rotating speed of the agitating unit of the mixing pump may influence the increase of conductivity. For a polymer flocculant solution with a high MW, for example of Nalco Core Shell® 71038 the conductivity can be significantly increased at a residence time in the mixing pump and in the maturing pressure tank of about ≥5 seconds to about ≤30 minutes. A residence time of above 30 minutes may not lead to a significant increase of the conductivity. In general, after 30 minutes the maximum conductivity of the pressurized diluted polymer flocculant solution is obtained.

The number of cycles of the polymer flocculant solution when cycled through the mixing pump may help to increase the conductivity of the polymer flocculant solution. The polymer flocculant solution mixed in the mixing pump can completely bypass the recirculation and have only one cycle. However, it was found that some recirculation of about ≥5 wt.-% to about ≤20 wt.-%, meaning that from 100 liter of polymer solution about ≥5 liter to about ≤20 liter are recirculated back into the mixing pump again, can be favourable.

According to one aspect an outlet port of the mixing pump can be connected to one end of the diluted mixed flocculant line which connects with the other end to the at least one pressurized processing tank, whereby the flocculant line comprises preferably a multi-way valve, preferably a three-way valve, to which a recirculation line is connected at one end and with the other end the recirculation line is connected with the mixing point or an inlet port of the mixing pump.

According to one embodiment the flocculant solution and the solvent, preferably water, can be lead as separated fluid streams to a mixing point at which both fluid streams are combined. The mixing point, also named "mixing point unit" may comprises velocity elements or there like that mixes both fluid streams. However, in generally the mixing point is the position at which the concentrated flocculant solution and the solvent, preferably water, flow together; respectively both fluid flows of the concentrated flocculant solution and of the solvent are combined.

According to another embodiment the mixing pump comprises the mixing point, that means the mixing point or mixing point unit is integrated in the mixing pump and/or the mixing pump is connected with the mixing point that means the mixing point or mixing point unit is separated from the mixing pump.

The apparatus comprise a maturing pressure tank to which diluted flocculant solution is pumped from the mixing pump. The maturing pressure tank is used to store the diluted flocculant solution.

The polymeric flocculant that is mixed and diluted with the solvent matures in the maturing pressure tank. Without being bounded to a specific theory, the polymeric flocculant chains that are twisting and coiled in a concentrated solution to some extend unfold in its mixed and diluted status if stored for a while in the maturing pressure tank. However, the matured diluted flocculant solution shows an increased activity in sludge dewatering compared to the same diluted flocculant solution that is not matured and used directly after the diluting and mixing step with the solvent, preferably water.

Diluted flocculant solution that is stored in the maturing pressure tank and diluted flocculant solution that flows out of the maturing pressure tank after stored is referred to as matured diluted flocculant solution in this specification.

According to one aspect the apparatus may comprises in addition
- at least one flocculant solution reservoir,
- at least a first supply line comprising at least one conveyance pump, that pumps the concentrated flocculant solution from a calibration vessel to the mixing point, and
- at least one second solution supply line, whereby the solution is preferably water, and the second solution supply line is connected with a solvent source at one end and to a mixing point at the other end, whereby at the mixing point the concentrated flocculant stock solution is mixed with the solvent, preferably water.

The second diluting solution supply line of the apparatus can be connected with a solution source, preferably to a water delivery system, whereby the second solution supply line comprises preferably at least one water filter, at least one pressure relief valve and/or at least one solenoid valve.

Further, a first supply line can be connected with one end to the calibration vessel and with the other end to the mixing point or the mixing pump, whereby the first supply line further comprises at least two multi-way-valves, preferably tree-way-valves, to which a supply line circuit is connected. Further, a conveyance pump can be connected to the supply line and an overpressure valve can be connected before an inlet port and after an outlet port of the conveyance pump that opens if the pressure in the supply line is higher than a given value to protect the apparatus against overpressure.

The solvent source can be preferably water. The solvent source can be connected to a supply line, such as a water line, having a pressure above atmosphere, for example of about $\geq 15$ N/cm² to about $\leq 160$ N/cm². In case the pressure of the solvent source is higher that the pressure of the pressurized diluted flocculant solution it can be preferred that a pressure reducer is integrated in the solution supply line also named "second solution supply line" to equal the pressure of the solution supply line to the pressurized diluted flocculant solution and/or to the pumping pressure of the mixing pump.

According to another aspect the apparatus comprises in addition a feeding unit with an inline mixer, wherein the inline mixer is integrated in the aqueous process stream so that the diluted flocculant solution can be fed to and mixed in the process stream, preferably within the slurry, to be treated, whereby preferably a feeding line connects the maturing pressure tank to the inline mixer.

The feeding line that connects the maturing pressure tank to the inline mixer may comprise at least one dosing regulator unit that regulates and/or controls the amount of diluted flocculant solution that is fed by the feeding unit into the aqueous process stream.

The benefit of the present apparatus is that the diluted flocculant solution can be dispensed to the aqueous process stream, such as sludge, without the need of a dispensing pump. Due to the pressurized diluted flocculant solution it can be dispensed by a simple dosing unit that opens and closes an opening, for example a feeder gate. According to one aspect the apparatus doesn't have a pump for feeding the diluted flocculant solution received from the maturing pressure tank to the aqueous process stream, such as sludge.

The inline mixer can be a hollow shaft with a slit also named quill. Preferably the diameter of the slit increases with the length of the slit extending from the dosing unit. The inline mixer may comprise at least one wing, preferably at least two wings, to improve the stirring of the diluted flocculant solution into the aqueous process stream, preferably sludge.

According to one aspect the rotating speed of the inline mixer can be about $\geq 500$ rpm (rotation per minute) to about $\leq 5000$ rpm, preferably about $\geq 1000$ rpm to about $\leq 3000$ rpm.

The thickness of the wings can be about $\geq 5$ mm to about $\leq 20$ mm and preferably about $\geq 10$ mm to about $\leq 12$ mm.

According to another aspect the pressure of the diluted flocculant solution in the apparatus from the maturing pressure tank up to the dosing unit is of at least about $\geq 15$ N/cm² to about $\leq 100$ N/cm², preferably of at least about $\geq 20$ N/cm² to about $\leq 80$ N/cm², more preferred of at least about $\geq 25$ N/cm² to about $\leq 60$ N/cm², further more preferred of at least about $\geq 30$ N/cm² to about $\leq 50$ N/cm² or of at least about $\geq 45$ N/cm² to about $\leq 75$ N/cm².

It should be noted again that from the maturing pressure tank up to the dosing unit no pump is required for pumping the diluted flocculant solution to the aqueous process stream to be treated.

According to another aspect the apparatus comprises in addition a controller that controls and regulates the pump, the fluid flow of the concentrated flocculant solution, of the diluted flocculant solution, and/or the feeding unit including the Mixer.

According to another aspect the apparatus may comprise at least one dry run sensor, at least one pressure sensor, and/or at least one flow meter that is arranged to:
- at least one first supply line, and/or
- at least one second solution supply line, and/or
- at least one line that connects the mixing pump with the pressurized processing tank, and/or
- at least one feeding line that connects the maturing pressure tank to the inline mixer.

According to another aspect the apparatus may comprise a calibration vessel, preferably a calibration cylinder, connected with the conveyance pump, and configured to calibrate concentrated flocculant solution to the mixing point.

BRIEF DESCRIPTION OF THE DRAWINGS

Now the invention will be explained by way of examples with reference to the accompanying drawings in which.

Figure 1:
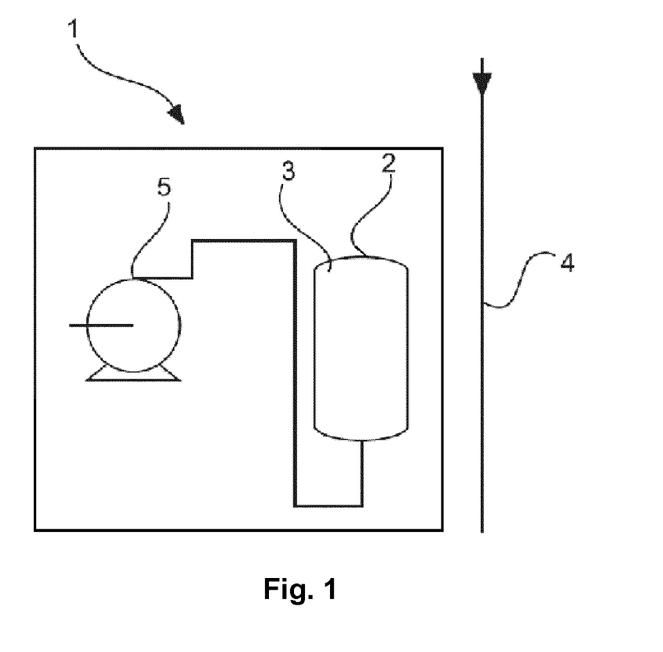
FIG. 1 is a view of an apparatus for preparing and dispensing a flocculant solution to dewatering an aqueous process stream with a mixing pump and a pressurized processing tank.

FIG. 1 shows an apparatus 1, suitable for preparing and dispensing a flocculant solution to dewatering an aqueous process stream 4, wherein the apparatus 1 comprises at least one mixing pump 5 for pressurizing and mixing a diluted flocculant solution 3, whereby due to the mixing of the mixing pump 5 the conductivity of the flocculant solution is increased, and at least one maturing pressure tank 2 in which a diluted flocculant solution 3 is stored and/or matured under pressure that is above atmosphere pressure.

Figure 2:
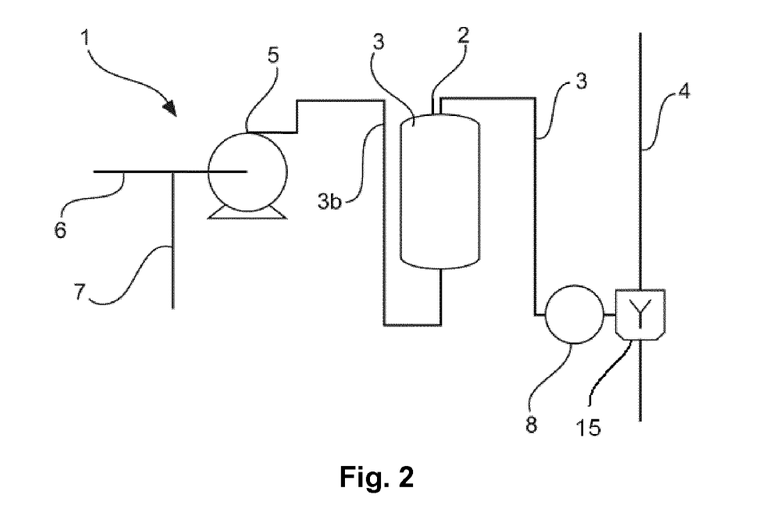
FIG. 2 is a more detailed schematic view of an apparatus for preparing and dispensing a flocculant solution to improve dewatering of an aqueous process stream with a pressurized processing tank.

FIG. 2 shows an apparatus 1 which comprises at least one maturing pressure tank 2 in which a diluted flocculant solution 3 is stored and/or matured under pressure that is above atmosphere pressure. The apparatus 1 comprises further a mixing pump 5 for mixing a concentrated flocculant solution with a solvent, preferably water, obtaining a diluted flocculant solution 3, whereby due to the mixing of the mixing pump 5 the conductivity of the flocculant solution is increased, and a maturing pressure tank 2 in which the pressurized diluted flocculant solution 3 received from the mixing pump 5 is lead into via a diluted flocculant line 3b and stored under pressure that is above atmosphere pressure. An inline mixer 15 with a motor unit 8 is connected with the maturing pressure tank 2, for feeding diluted flocculant solution 3 into the aqueous process stream 4.

Figure 3:
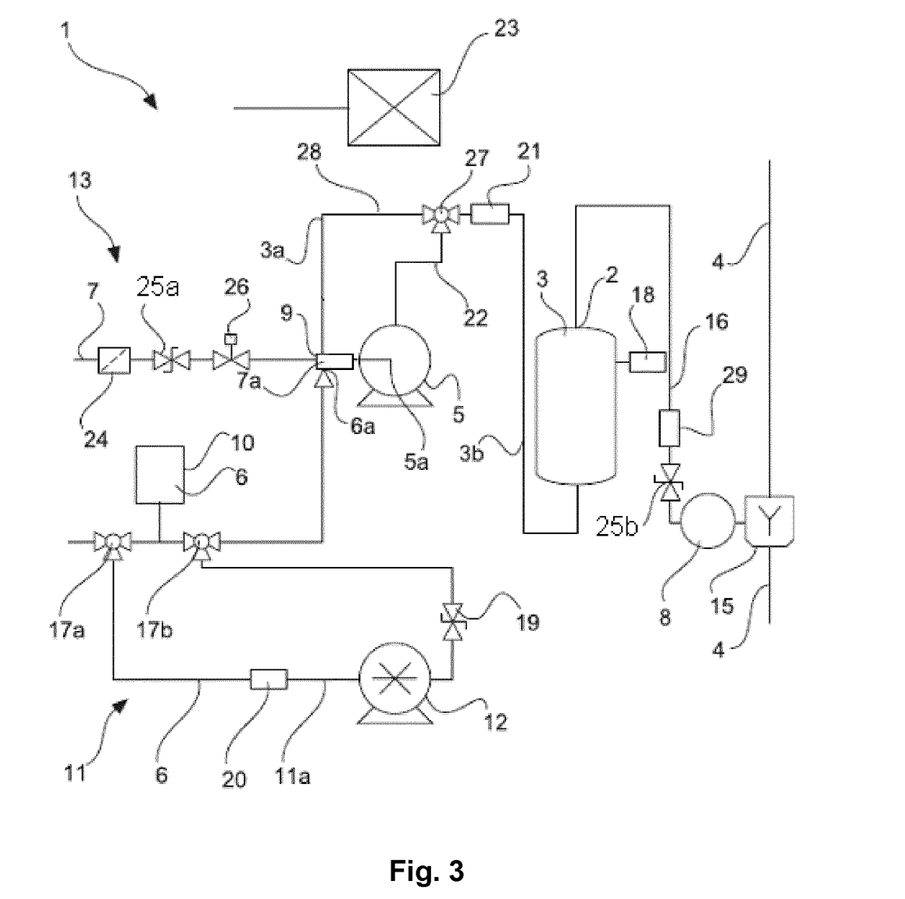
FIG. 3 is a detailed schematic view of an apparatus for preparing and dispensing a flocculant solution to improve dewatering of an aqueous process stream with a pressurized processing tank.

FIG. 3 shows an apparatus, 1 which comprises at least one maturing pressure tank 2 in which in a mixing pump circuit 3a a diluted flocculant solution 3 is stored and/or matured under pressure that is above atmosphere pressure. The apparatus 1 comprises further a mixing pump 5 with a fluid pump inlet port 5a and a fluid pump outlet port 5b for mixing a concentrated flocculant solution with a solvent, preferably water, obtaining a diluted flocculant solution 3, and a maturing pressure tank 2 in which the pressurized diluted flocculant solution 3 received from the mixing pump 5 is lead via a diluted flocculant line 3b into and stored under pressure that is above atmosphere pressure.

A line 22 connects the mixing pump 5 with the maturing pressure tank 2 and an inline mixer 15 with a motor unit 8 is connected with the maturing pressure tank 2, for feeding diluted flocculant solution 3 into the aqueous process stream 4, whereby a feeding line 16 connects the maturing pressure tank 2 with the inline mixer 15 with a motor unit 8 that mixes the diluted flocculant solution into the aqueous process stream. A pressure relief valve 25b can be arranged between the maturing pressure tank 2 and the mixing unit 15 with a motor 8, or the pressure relief valve 25b is arranged downstream the pressurized vessel, to avoid overpressure in the vessel. The feeding line 16 that connects the maturing pressure tank 2 to the mixer 15 with a motor unit 8, which is connected to the inline mixer 15 comprises a dosing regulator unit 29 that regulates and/or controls the amount of diluted flocculant solution 3 that is fed by the mixer 15 with a motor unit 8 into the aqueous process stream 4.

Further the mixing pump 5 is connected with a mixing point 9 and a calibration vessel 10 is connected with a first supply line 11 comprising a conveyance pump 12 that pumps the concentrated flocculant solution 6 from the calibration vessel 10 to the concentrated flocculant solution feeding port 6a of the mixing point 9. An outlet port 5b of the mixing pump 5 is connected to one end of the diluted mixed flocculant line 22 which connects with the other end to the at least one maturing pressure tank 2, whereby the flocculant line 22 comprises a three-way valve 27, to which a recirculation line 28 is connected at one end and with the other end the recirculation line 28 is connected with the mixing point 9 which is connected to an inlet port 5a of the mixing pump 5. This circuit allows that the diluted flocculant solution can be recirculated and mixed with the mixing pump 5. Further a flow meter 21 is arranged between the three-way valve 27 and the maturing pressure tank 2 to control the fluid flow of the concentrated flocculant solution to the maturing pressure tank 2.

A second solution supply line 13 is connected with a solvent source 14—not shown—at one end and to the solution feeding port 7a of the mixing point 9 at the other end, whereby at the mixing point 9 the concentrated flocculant stock solution is mixed with the solvent 7, preferably water.

The apparatus has further a mixer 15 with a motor unit 8, which is not a pump, that means the dosing of the diluted flocculant solution is driven by the pressure of the pressurized diluted flocculant solution, wherein the mixing elements of the inline mixer 15 is integrated in the aqueous process stream 4 so that the diluted flocculant solution 3 can be fed to and mixed in the process stream 4, preferably within the slurry, to be treated, whereby a feeding line 16 connects the maturing pressure tank 2 to the mixer 15 with the motor unit 8.

A controller 23 controls and regulates the fluid flow of the concentrated flocculant solution 6, the fluid flow of the diluted flocculant solution 3, and/or the dosing of diluted flocculant solution 3 by means of a mixer 15 preferably an inline mixer 15, to the aqueous process stream 4. Further the controller 23 may control and regulate the speed of the mixer 15.

The first supply line 11 is connected with one end to the calibration vessel 10 and with the other end to the mixing point 9 or the mixing pump 5, whereby the first supply line 11 comprises two multi-way-valves 17a/17b and a supply line circuit 11a. The valves 17a/17b are for calibration of the pump.

A conveyance pump 12 is connected to the supply line 11a and an overpressure valve 19 is connected before an inlet port and after an outlet port of the conveyance pump 12 that opens if the pressure in the supply line 11/11a is higher than a given value to protect the apparatus against overpressure.

A pressure sensor 18, such as a manometer, is arranged at the maturing pressure tank 2 to indicate the pressure of the maturing pressure tank 2. At the supply line 11/11a a dry run sensor 20 is arranged to control the filling level of the concentrated flocculant solution 6 in order to give a signal or stop the apparatus if there is the danger that the device is running dry of concentrated flocculant solution 6.

The second diluting solution supply line 13 is connected with a solution source 14 not shown, preferably to a water delivery system, whereby the second solution supply line 13 comprises a water filter 24, a pressure relief valve 25a and a solenoid valve 26. The apparatus 1 may comprise at least one check valve to avoid water/polymer contact arranged before the mixing point not shown.

Figure 4:
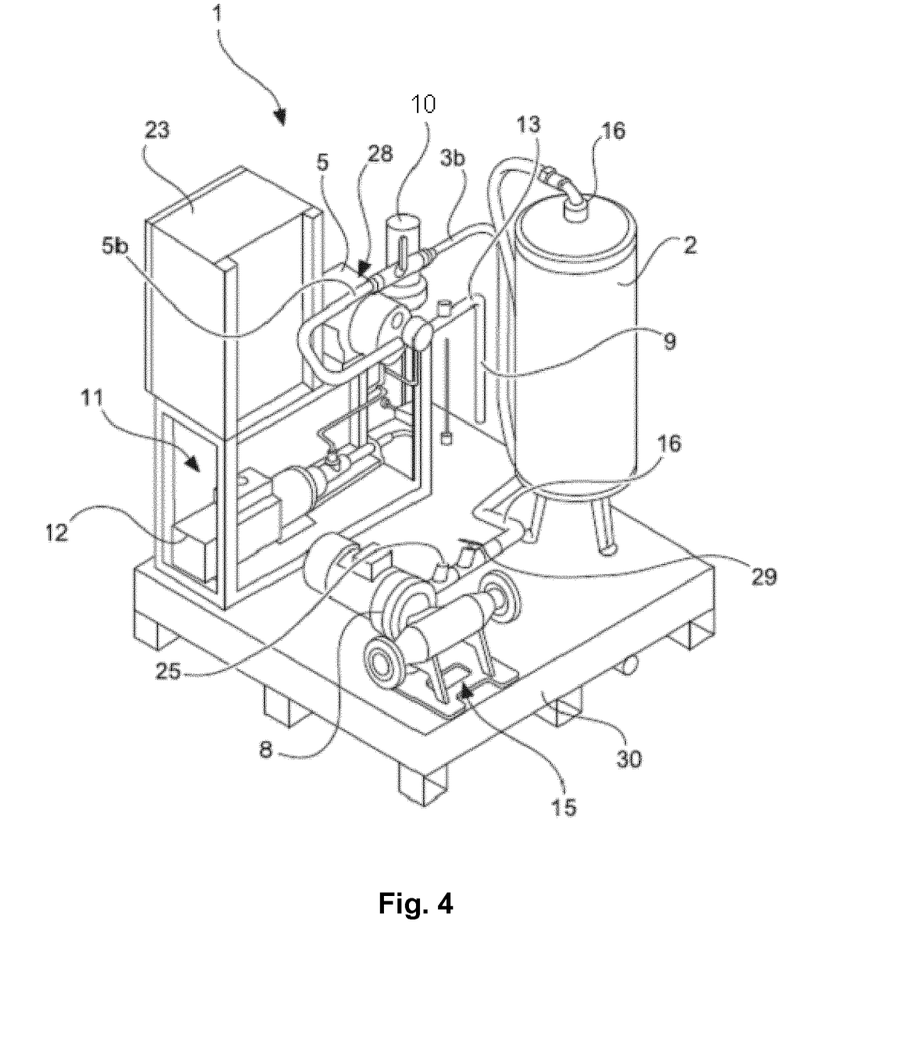
FIG. 4 is a first perspective view of an apparatus for preparing and dispensing a flocculant solution to improve dewatering of an aqueous process stream with a pressurized processing tank.

FIG. 4 shows an apparatus 1 for preparing and dispensing a flocculant solution to dewatering an aqueous process stream placed on a pallet which also has a function of a dripping tray 30. A conveyance pump 12 is connected to a first end of the first supply line 11 and with the second end the first supply line 11 is connected with the mixing point 9 so that concentrated flocculant solution is pumped to the mixing point 9. Further a calibration vessel 10, preferably having a cylinder design, is connected with the conveyance pump 12 to calibrate concentrated flocculant solution that is pumped to the mixing point 9.

A second solution supply line 13 that transports a solvent, preferably water, is connected to the mixing point 9 too. At the mixing point 9 a concentrated flocculant solution and a solvent, preferably water, are combined. The mixing point 9 is part of the mixing pump 5 at which the concentrated flocculant solution and the solvent, preferably water, are combined. A recirculation line 28 that can be connected with the mixing pump 5 or the mixing point 9 at one end and at the other end with the mixing pump outlet 5b of the mixing pump 5 for mixing and circulating the flocculant solution.

A diluted flocculant solution line 3b transports mixed and diluted flocculant solution from the mixing pump 5 to the maturing pressure tank 2. From the maturing pressure tank 2 matured diluted flocculant solution flows through a feeding line 16 to the inline mixer 15 with a motor 8. A dosing regulator unit 29 for dosing the amount of diluted matured flocculant solution and a pressure relief valve 25b for reducing the pressure of the diluted matured flocculant solution in case of an overpressure can be connected to the feeding line 16. The arrangement of the dosing regulator unit 29 and the pressure relief valve 25b can be placed vice versa. For example, the pressure relief valve 25b can be arranged in the outlet of the maturing pressure tank 2 or directly at the outlet of the maturing pressure tank 2. The fluid transport of the solvent, concentrated flocculant solution, diluted flocculant solution and matured flocculant solution is controlled and regulated by a controller 23. Valves and sensors for operating the fluid flow of the solvent, concentrated flocculant solution, diluted flocculant solution and matured flocculant solution are not shown in FIG. 4.

Figure 5:
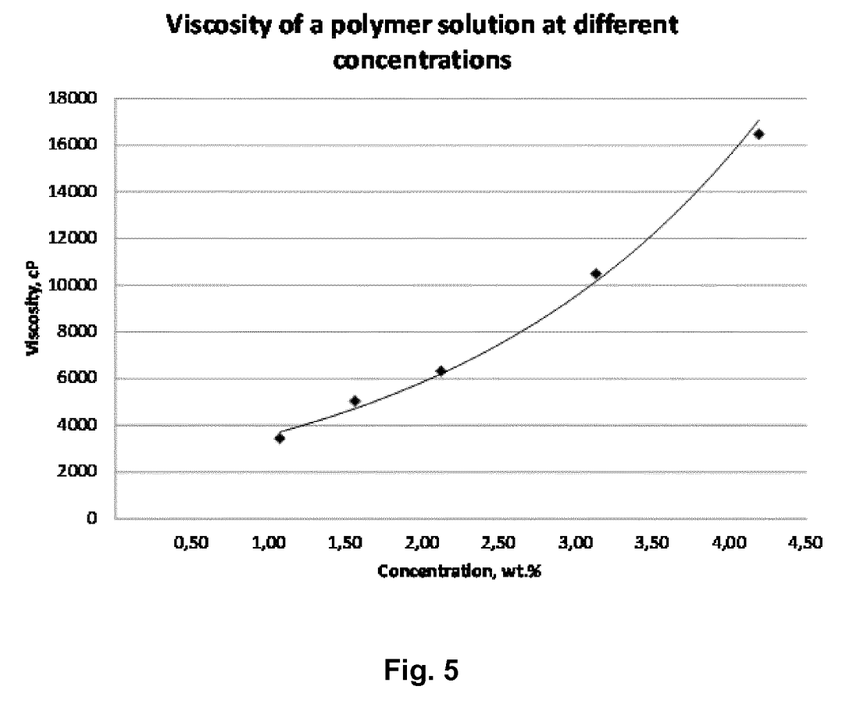
FIG. 5 is a graph of the viscosity of an aqueous polymer solution at different concentrations.

FIG. 5 shows that an increase of the polymer flocculant concentration increases the viscosity of the aqueous polymer flocculant solution. The polymer flocculant is an Acrylamide-based polymer, Nalco Core Shell® 71038. It can be seen from the graph of FIG. 6 that the viscosity of a 1 wt.-% aqueous polymer flocculant solution has a viscosity of about 3.8 Pa·s (3800 cP). When increasing the viscosity to a 4 wt.-% aqueous polymer flocculant solution, it can be taken from the graph of FIG. 5 that the increase of the viscosity tends to have an exponential increase to a viscosity of about 17 Pa·s (17000 cP). The viscosity was measured with a Brookfield DV-E viscometer at a temperature of 21.4° C., with a S64V-1 spindle at a rotation speed of 20 rpm.

Conductivity is a good parameter for defining the degree of activation of a polymer depending on the rotation speed.

Figure 6:
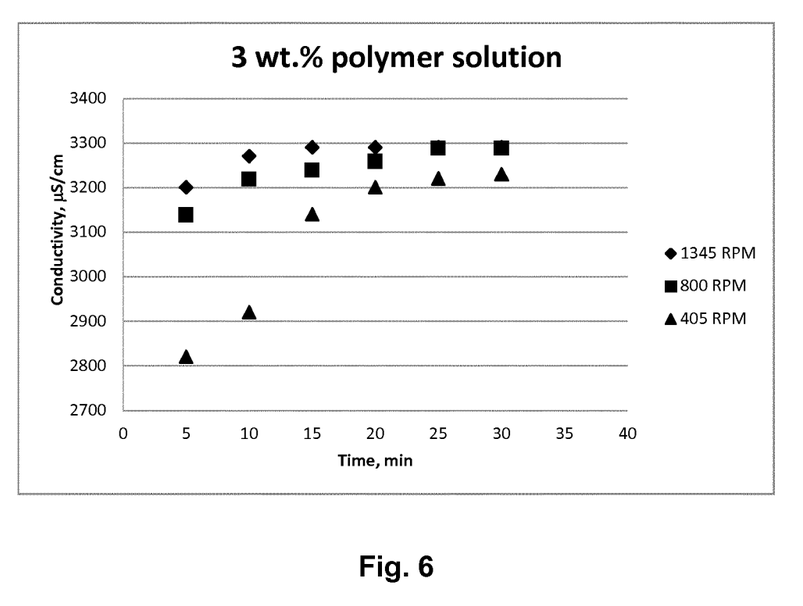
FIG. 6 is a graph of the conductivity of 3 wt.-% aqueous polymer solution at different stirring speed over time.

FIG. 6 shows the conductivity of a diluted aqueous polymer flocculant solution at a 3 wt.-% concentration stirred at a rotation speed of 405 rpm, 800 rpm and 1345 rpm over time measured in a 250 ml beaker filled with 180 ml of the aqueous polymer flocculant solution. An IKA RW16 overhead stirrer motor with a Philips hand kitchen mixer blade was used for stirring the diluted aqueous polymer flocculant solution. The graph of FIG. 6 clearly shows that the increase of rotation speed increases the conductivity and shortens the time to achieve the maximum conductivity. The conductivity was measured with an EC Testr 11™ available from the company Eutech Instruments.

Increasing the rotation speed from 405 rpm to 800 rpm and 1345 rpm demonstrate that the conductivity as well as the activation time improves significantly. The conductivity was measured with a SevenGo™ conductivity meter available from the company Mettler Toledo.

The polymer activation, also named the activity of the mixed diluted polymer solution, is defined as follows:

% Polymer Activation=(Condt−Condw)/(Condf−Condw)×100 wherein:
  Condt=Conductivity of the dilute polymer solution at time t
  Condw=Conductivity of the make-down water*[1]
  Condf=Conductivity of the dilute polymer solution after complete activation and aging

*[1]=make-down water means the water used for dissolving the neat polymer product. Neat polymer means the undiluted polymer that is the concentrated flocculant polymer solution before reaching the mixing point and before it is diluted with additional solvent, preferably water. The make down water is tap water with a conductivity of 560 μS/cm and a water hardness of 140 mg/l of $CaCO_3$.

Another object is directed to a method for preparing and dispensing a flocculant solution to dewater an aqueous process stream with an apparatus as described before, wherein a diluted flocculant solution is obtained with an increase of conductivity. The conductivity increased diluted flocculant solution can be stored and/or matured under pressure in a processing tank, whereby the pressure of the pressurized diluted flocculant solution is uphold when stored in the processing tank.

According to one aspect of the method the diluted flocculant solution in order to increase the conductivity thereof can be mixed with a mixing pump at about ≥100 rpm (rotation per minute) to about ≤5000 rpm, preferably about ≥200 rpm to about ≤4800 rpm, further preferred about ≥400 rpm to about ≤4600 rpm, more preferred about ≥600 rpm to about ≤4200 rpm and even more preferred about ≥800 rpm to about ≤4000 rpm and most preferred about ≥1000 rpm to about ≤4000 rpm or about ≥2000 rpm to about ≤3000 rpm.

The increased conductivity of the matured diluted flocculant solution can be upheld, if stored under pressure in the maturing pressure tank.

The matured flocculant solution may be stored in the maturing pressure tank, for example with an increase of the conductivity, at pressure of at least about ≥15 $N/cm^2$ to about ≤100 $N/cm^2$, preferably of at least about ≥20 $N/cm^2$ to about ≤80 $N/cm^2$, more preferred of at least about ≥25 $N/cm^2$ to about ≤60 $N/cm^2$, further more preferred of at least about ≥30 N/cm² to about ≤50 N/cm² or about ≥45 N/cm² to about ≤75 N/cm² for a time period of ≥1 minute to about ≤60 minutes, more preferably a period of about of ≥5 minutes to about ≤20 minutes.

According to one aspect a diluted flocculant solution is obtained, whereby a concentrated flocculant solution comprises of about ≥10 wt.-% to about ≤60 wt.-%, preferably ≥10 wt.-% to about ≤30 wt.-%, or about ≥40 wt.-% to about ≤50 wt.-% of a flocculant, preferably a polymeric flocculant, is diluted and mixed with a solvent, preferably water, providing a diluted flocculant solution comprising of about ≥0.05 wt.-% to about ≤4 wt.-%, preferably about ≥1 wt.-% to about ≤2 wt.-% flocculant, preferably polymeric flocculant, whereby the wt.-% is based on the total weight of the flocculant solution.

The concentrated flocculant solution may comprise an organic solvent, preferably a liquid hydrocarbon.

For example, the activity as well as the conductivity of the matured polymeric flocculant solution can be increased, if stored under pressure for a about ≥1 minute to ≤10 hours, preferably about ≥3 minutes to about ≤5 hours, further preferred about ≥5 minutes to about ≤1 hours, more preferred about ≥5 minutes to about ≤30 minutes or about ≥10 minutes to about ≤20 minutes or about ≥5 minutes to about ≤20 minutes.

According to one embodiment the pressurized diluted flocculant solution can be stored and/or matured in the maturing pressure tank at a pressure of at least about ≥15 N/cm² to about ≤100 N/cm², preferably of at least about ≥20 N/cm² to about ≤80 N/cm², more preferred of at least about ≥25 N/cm² to about ≤60 N/cm², further more preferred of at least about ≥30 N/cm² to about ≤50 N/cm² or of at least about ≥45 N/cm² to about ≤75 N/cm².

The method comprises further that the diluted flocculant solution that was stored in the pressurized processing tank, also named matured diluted flocculant solution, is dispensed into an aqueous process stream, preferably sludge.

Another aspect is a method for preparing and dispensing a flocculant solution to dewatering an aqueous process stream with an apparatus as mentioned before, wherein the fluid flow of the pressurized diluted flocculant solution into the process stream is driven by the pressure of the pressurized diluted flocculant solution generated from the mixing pump.

All publications and patent applications in this specification are indicative of the level of ordinary skill in the art to which this invention pertains. The invention has been described to various specific and preferred embodiments and techniques. However, it should be understood that many variations and modifications may be made while remaining within the spirit and scope of the invention.

LIST OF REFERENCE NUMERALS 1 apparatus
2 maturing pressure tank
3a mixing pump circuit
3b diluted flocculant line
3 diluted flocculant solution
4 aqueous process stream
5 mixing pump
5a mixing pump inlet port
5b mixing pump outlet port
6 concentrated flocculant solution
6a concentrated flocculant solution feeding port
7 solvent
7a solvent feeding port
8 feeding unit
9 mixing point
10 calibration vessel
11 first supply line
11a supply line circuit
12 conveyance pump
13 second solution supply line
14 solvent source (not shown)
15 inline mixer
16 feeding line
17 multi-way valves (17a/17b)
18 pressure sensor
19 overpressure valve
20 dry run sensor
21 flow meter
22 flocculant line
23 controller
24 water filter
25a/b pressure relief valve
26 solenoid valve
27 three-way valve
28 recirculation line
29 dosing regulator unit
30 dripping tray

The invention claimed is:

1. An apparatus, suitable for preparing and dispensing a flocculant solution to dewatering an aqueous process stream, the apparatus comprising:
a mixing pump that mixes a concentrated flocculant solution with a solvent to produce a pressurized diluted flocculant solution, the mixing pump including a mixing point that has a concentrated flocculant solution feeding port and a solvent feeding port,
a maturing pressure tank, whereby the maturing pressure tank is fluidly connected with the mixing pump, so that the pressurized diluted flocculant solution is led from the mixing pump into the maturing pressure tank and matured therein under pressure that is above atmosphere pressure,
a calibration vessel,
a first supply line comprising at least one conveyance pump, the calibration vessel fluidly connected to the at least one conveyance pump such that the at least one conveyance pump is configured to convey the concentrated flocculant solution from the calibration vessel to the concentrated flocculant solution feeding port at the mixing point of the mixing pump,
a second solution supply line connected with a solvent source at one end and to the solvent feeding port at the mixing point of the mixing pump at a second end, whereby at the mixing point of the mixing pump the concentrated flocculant solution is mixed with the solvent, and
a feeding unit with an inline mixer, wherein the inline mixer is integrated in the aqueous process stream so that the pressurized diluted flocculant solution can be fed to and mixed in the aqueous process stream, whereby a feeding line connects the maturing pressure tank to the inline mixer.

2. The apparatus according to claim 1, wherein the mixing pump is a centrifugal pump.

3. The apparatus according to claim 1, wherein the pressurized diluted flocculant solution is led from the mixing pump by a pressure of the pressurized diluted flocculant solution so that in a fluid flow direction, after the mixing pump, a fluid flow is driven by the pressure of the pressurized diluted flocculant solution and no additional pump is arranged in the fluid flow direction, after the mixing pump.

4. The apparatus according to claim 1, wherein the pressurized diluted flocculant solution in the maturing pressure tank is pressurized at a pressure of at least about $\geq 15$ $N/cm^2$ to about $\leq 100$ $N/cm^2$.

5. The apparatus according to claim 1, further comprising a controller that controls and regulates a fluid flow of the concentrated flocculant solution by means of the inline mixer.

6. The apparatus according to claim 1, wherein the first supply line is connected with one end to the calibration vessel and with another end to the mixing pump, whereby the first supply line further comprises two multi-way-valves to which a supply line circuit is connected.

7. The apparatus according to claim 1, whereby the at least one conveyance pump is connected to the first supply line and an overpressure valve is connected after an outlet port of the at least one conveyance pump.

8. The apparatus according to claim 1, which comprises a pressure sensor that is arranged to the first supply line.

9. The apparatus according to claim 1, whereby the second solution supply line is connected with the solvent source whereby the second solution supply line comprises a water filter and a pressure relief valve.

10. The apparatus according to claim 1, whereby an outlet port of the mixing pump is connected to one end of a diluted mixed flocculant line, and another end of the diluted mixed flocculant line is connected to the maturing pressure tank, whereby the diluted mixed flocculant line comprises a multi-way valve, one end of a recirculation line is connected to the multi-way valve and another end of the recirculation line is connected to an inlet port of the mixing pump.

11. The apparatus according to claim 1, whereby the feeding line that connects the maturing pressure tank to the inline mixer comprises at least one dosing regulator unit that regulates and controls an amount of the pressurized diluted flocculant solution that is fed by the feeding unit into the aqueous process stream.

12. The apparatus according to claim 1, wherein the calibration vessel is configured to calibrate the concentrated flocculant solution to the mixing point.

13. A method for preparing and dispensing a flocculant solution, the method comprising the steps of:
conveying a concentrated flocculant solution from a calibration vessel to a concentrated flocculant solution feeding port of a mixing point at a mixing pump via a first supply line, wherein the calibration vessel is fluidly connected to a conveyance pump such that the conveyance pump conveys the concentrated flocculant solution from the calibration vessel to the concentrated flocculant solution feeding port at the mixing point of the mixing pump;
conveying a solvent from a solvent source at one end of a second solution supply line to a solvent feeding port at the mixing point of the mixing pump at a second end of the second solution supply line;
mixing the concentrated flocculant solution with the solvent at the mixing point of the mixing pump using the mixing pump;
pressurizing the concentrated flocculant solution during the mixing to produce a diluted pressurized flocculant solution;
directing the diluted pressurized flocculant solution from the mixing pump to a maturing pressure tank that is fluidly connected with the mixing pump; and
holding the diluted pressurized flocculant solution in the maturing pressure tank at a pressure that is above atmospheric pressure; and
feeding the diluted pressurized flocculant solution to a process stream via a feeding line that connects the maturing pressure tank to an inline mixer of a feeding unit, the inline mixer integrated in the process stream to feed and mix the diluted pressurized flocculant solution in the process stream.

14. The method according to claim 13, wherein the diluted pressurized flocculant solution is directed to the maturing pressure tank by the pressure of the diluted pressurized flocculant solution generated from the mixing pump.

\* \* \* \* \*

UNITED STATES PATENT AND TRADEMARK OFFICE
CERTIFICATE OF CORRECTION

PATENT NO. : 11,319,223 B2
APPLICATION NO. : 15/502119
DATED : May 3, 2022
INVENTOR(S) : José Rafael Hernández Carucci et al.

Page 1 of 1

It is certified that error appears in the above-identified patent and that said Letters Patent is hereby corrected as shown below:

In the Claims

Column 16, Claim 13, Line 8, delete "of" and insert -- at --

Column 16, Claim 13, Line 8, delete "at" and insert -- of --

Signed and Sealed this
Thirty-first Day of January, 2023

Katherine Kelly Vidal
*Director of the United States Patent and Trademark Office*